United States Patent
Bousset

(10) Patent No.: US 8,769,761 B2
(45) Date of Patent: Jul. 8, 2014

(54) END FITTING FOR A WIPER BLADE

(75) Inventor: Xavier Bousset, Mezel (FR)

(73) Assignee: Valeo Systèmes d'Essuyage, La Verriere (FR)

( * ) Notice: Subject to any disclaimer, the term of this patent is extended or adjusted under 35 U.S.C. 154(b) by 233 days.

(21) Appl. No.: 12/739,352

(22) PCT Filed: Oct. 2, 2008

(86) PCT No.: PCT/EP2008/063234
§ 371 (c)(1),
(2), (4) Date: Jun. 24, 2010

(87) PCT Pub. No.: WO2009/053229
PCT Pub. Date: Apr. 30, 2009

(65) Prior Publication Data
US 2010/0319154 A1 Dec. 23, 2010

(30) Foreign Application Priority Data
Oct. 22, 2007 (FR) ..................... 07 07363

(51) Int. Cl.
*B60S 1/38* (2006.01)

(52) U.S. Cl.
USPC .............. 15/250.43; 15/250.361; 15/250.201; 403/300; 403/308

(58) Field of Classification Search
CPC .... B60S 1/3886; B60S 1/3889; B60S 1/3891; B60S 1/3893
USPC .......... 15/250.43, 250.44, 250.451–250.454, 15/250.361, 250.201; 403/300, 308
See application file for complete search history.

(56) References Cited

U.S. PATENT DOCUMENTS

| 3,083,394 | A | * | 4/1963 | Scinta | ..................... 15/250.14 |
| 3,116,507 | A | * | 1/1964 | Scinta | ..................... 15/250.451 |
| 5,493,750 | A | | 2/1996 | Bollen et al. | |
| 2004/0200026 | A1 | | 10/2004 | Shanmugham | |
| 2007/0061993 | A1 | | 3/2007 | Lee | |
| 2008/0235896 | A1 | * | 10/2008 | Cheng | ..................... 15/250.201 |

FOREIGN PATENT DOCUMENTS

| DE | 20 2004 012109 U1 | | 9/2004 |
| EP | 1683695 | * | 7/2006 |
| FR | 2 868 748 A1 | | 10/2005 |

OTHER PUBLICATIONS

International Search Report issued in PCT/EP2008/063234, mailed on Dec. 9, 2008, with translation, 6 pages.

* cited by examiner

*Primary Examiner* — Gary Graham
(74) *Attorney, Agent, or Firm* — Osha Liang LLP

(57) ABSTRACT

The invention provides an end fitting (26) for a wiper blade (10) that can be mounted on a longitudinal end (10a) of the blade (10) and that comprises means (54) for locking the end (16a) of the vertebra (16) when in its inserted position in a longitudinal housing (32), these means being designed to engage with a slot (50) made in a longitudinal edge (52) of the end (16a) of the vertebra (16), characterized in that the locking means (54) are produced symmetrically with respect to a vertical longitudinal mid-plane of the longitudinal housing (32).

13 Claims, 4 Drawing Sheets

END FITTING FOR A WIPER BLADE

The invention proposes an end fitting for a wiper blade that is able to be mounted on one or other of the ends of the blade.

The invention proposes more particularly an end fitting for a wiper blade principally of longitudinal orientation, comprising a stiffening vertebra, a wiping rubber, and a mount supporting the vertebra and rubber, the fitting being able to be mounted on a longitudinal end of the blade, the fitting comprising a longitudinal housing open in the direction of a first longitudinal end of the fitting, in which a longitudinal end of the vertebra is able to be received, and comprising means for locking the end of the vertebra in an engaged position in the longitudinal housing that are able to cooperate with a notch produced in a longitudinal edge of the end of the vertebra.

The stiffening vertebra, the wiping rubber and the blade support mount are components of the blade that are principally of longitudinal orientation. The vertebra and rubber are introduced by longitudinal sliding in complementary longitudinal conduits in the mount.

The longitudinal locking of the vertebra and rubber in the conduits of the mount is achieved by end fittings mounted on each end of the blade.

Each fitting is produced so as to be locked on the associated end of the vertebra and so as to form a longitudinal stop for the associated ends of the mount and rubber.

Conventionally, the locking of the fitting in the engaged position on the vertebra is achieved by means of a notch produced in a longitudinal edge of the vertebra, receiving an associated locking member.

The two ends of the vertebra each comprise a notch, and the two notches are produced in the same longitudinal edge of the vertebra.

Thus, producing each fitting according to the end of the blade on which the fitting is intended to be mounted is known.

Because of this, the two fittings that must be mounted on a blade are different, which poses problems of increase in the number of items of equipment used for producing the components of the blade.

The aim of the invention is to propose an end fitting produced so that it is able to be mounted equally well on one or other of the two ends of the vertebra.

For this purpose, the invention proposes an end fitting as described previously, characterised in that the locking means are produced symmetrically with respect to a vertical longitudinal mid-plane of the longitudinal housing.

According to other features of the fitting according to the invention, taken in isolation or in combination:

- the fitting is produced symmetrically with respect to the said vertical longitudinal mid-plane of the longitudinal housing;
- the locking means comprises two elastic tongues, each of which is produced in a wall of the longitudinal housing, extending longitudinally in the direction of the second longitudinal end of the fitting, and wherein the free longitudinal end of each tongue is curved towards the inside of the longitudinal housing;
- the free end of one of the two tongues is able to be received in the notch in the longitudinal end of the vertebra, for locking of the vertebra in position in the longitudinal housing;
- the locking means are disengagable, to enable the fitting to be removed from the longitudinal end of the blade;
- the longitudinal housing is open towards the bottom at each elastic tongue to enable a tool to pass for causing a deformation of the tongues;
- the fitting comprises two bottom hooks distributed symmetrically with respect to said vertical longitudinal plane of symmetry, which extend downwards from a bottom of the longitudinal housing, and which delimit a longitudinal conduit able to receive a top web of the wiping rubber;
- the second longitudinal end of the fitting comprises a transverse vertical wall that closes off the associated end of the longitudinal conduit;
- the fitting comprises a hollow body in which the longitudinal housing is produced and which comprises a housing for extending the longitudinal housing towards the first end of the fitting and in which a longitudinal end of the mount is able to be received.

The invention also proposes a wiper blade comprising a support mount, a stiffening vertebra and a wiping rubber, characterised in that each end of the blade carries a fitting as defined previously.

According to other features of the blade according to the invention, each longitudinal end of the vertebra comprises a notch and the notches are both arranged transversely on the same side with respect to a vertical longitudinal mid-plane of the vertebra.

Other features and advantages of the invention will emerge from a reading of the following detailed description, for an understanding of which reference will be made to the accompanying figures, among which:

For the description of the invention, the orientations vertical, longitudinal and transverse according to the reference frame V, L, T indicated in the figures will be adopted non-limitatively.

In the following description, identical, similar or analogous elements will be designated by the same reference signs.

Figure 1:
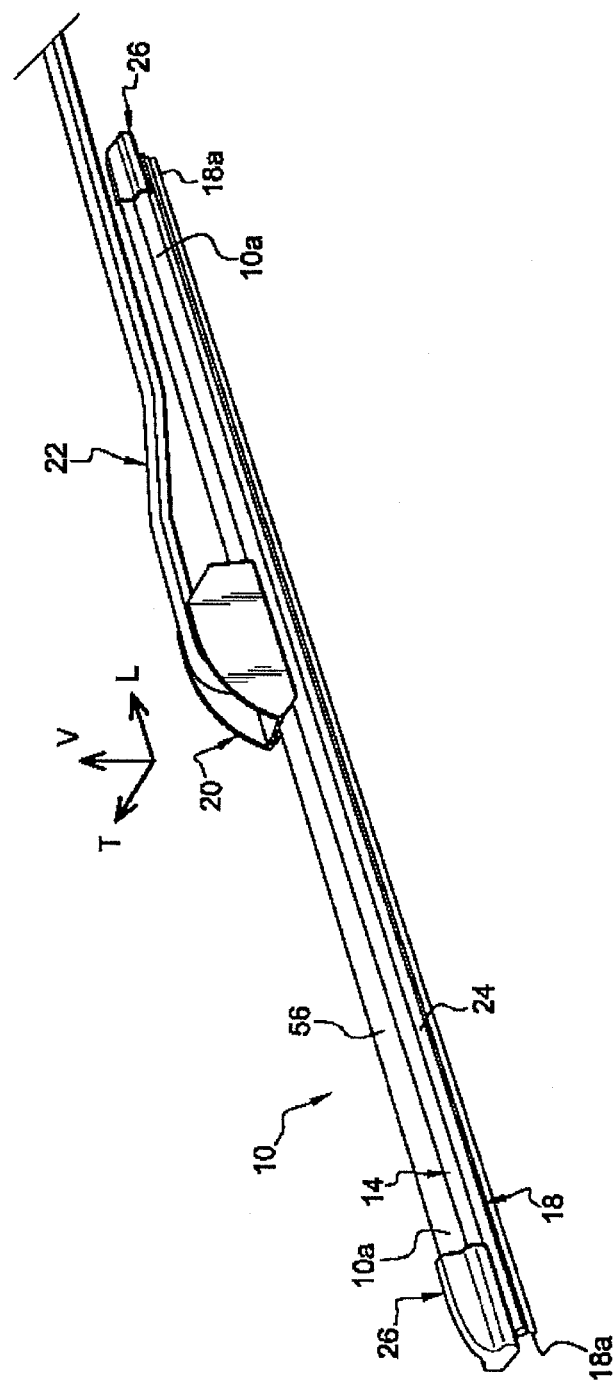
FIG. 1 is a schematic representation in perspective of a wiper blade comprising fittings according to the invention.

FIG. 1 shows a wiper blade 10 for a glazed panel of a motor vehicle such as a front windscreen of the vehicle.

The blade 10 is a blade of the "flat blade" type and is here principally oriented longitudinally.

Figure 2:
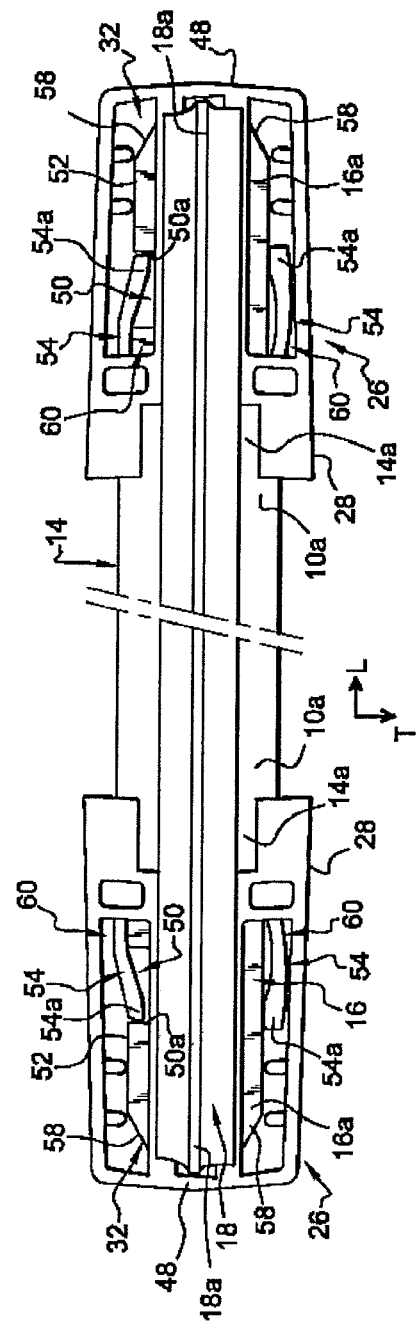
FIG. 2 is a partial view from below of the blade shown in FIG. 1, showing the means of locking the fittings and the notches on the vertebra.

As can be seen in FIG. 2, the blade 10 comprises a hollow support mount 14 and a longitudinal stiffening vertebra 16 arranged in the mount 14, which constitute the structure of the blade 10 proper.

The support mount 14 also carries a connector 20 for mounting and articulation of the blade 10 on the free end of an arm 22 driving the blade 10 in a sweeping movement with respect to the glazed panel, and carries a bottom rubber 18 that is produced from a flexible material, and is able to come into contact with the glazed panel to be wiped.

The stiffening vertebra 16 consists of a horizontal metal strip that is curved vertically, so that, when the blade 10 is in abutment on the glazed panel, the bearing forces exerted by the driving arm 22 are distributed over the entire length of the rubber 18.

The mount 14 carries the vertebra 16 and the rubber 18.

For this purpose, the mount 14 is hollow, comprises a longitudinal central conduit (not shown) that receives the vertebra 16, and comprises facing bottom hooks 24 that delimit a longitudinal bottom conduit open towards the bottom, in which a top web of the rubber 18 is received.

The vertebra 16 and rubber 18 are introduced into the respective conduits in the mount 14 in a longitudinal sliding movement.

When the vertebra 16 and rubber 18 are in position mounted on the mount 14, their longitudinal ends 16a, 18a project longitudinally with respect to the associated longitudinal end 14a of the mount 14, as can be seen in FIG. 2.

Each end 10a of the blade 10 carries an end fitting 26 that locks the vertebra 16 and rubber 18 in longitudinal sliding with respect to the mount 14, and improves the overall aesthetic appearance of the blade 10.

In the following description of a fitting the orientation from rear to front will be adopted as being the longitudinal direction from left to right looking at FIGS. 3 and 4. It will be understood that this orientation is not limitative and that its sole purpose is to simplify understanding of the invention.

Figure 4:
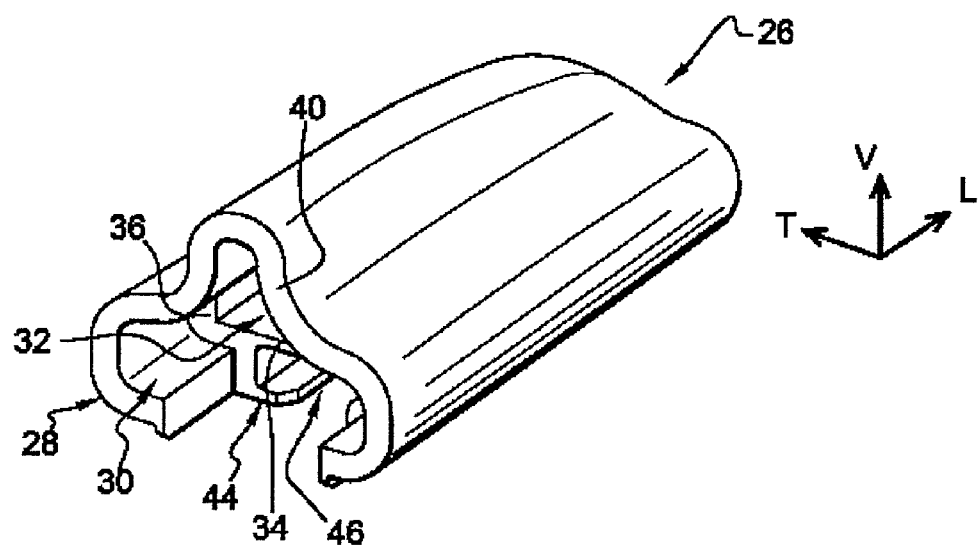
FIG. 4 is a schematic representation in perspective of the fitting shown in FIG. 3.
Figure 3:
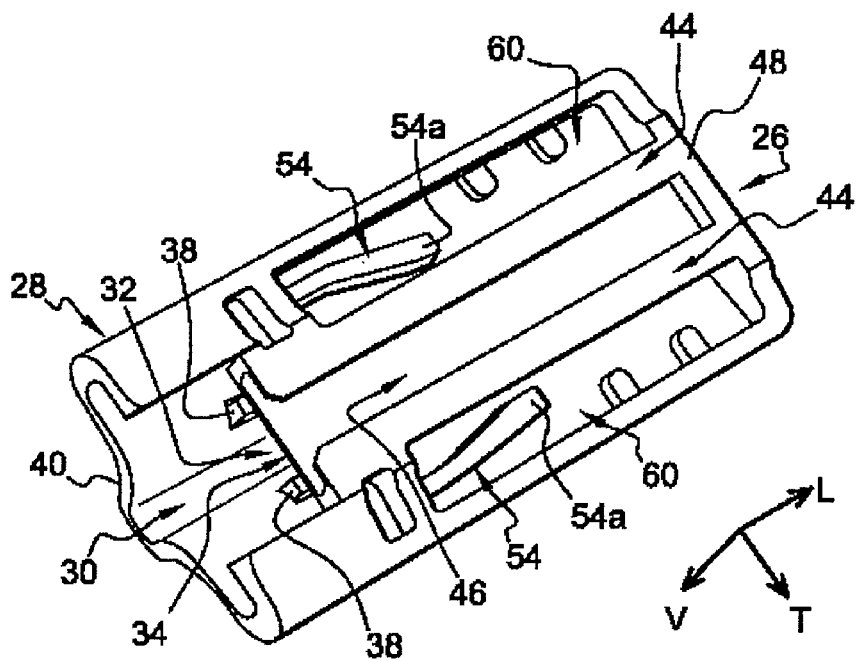
FIG. 3 is a detail to a larger scale of a fitting alone shown in FIG. 2'.
Figure 5:
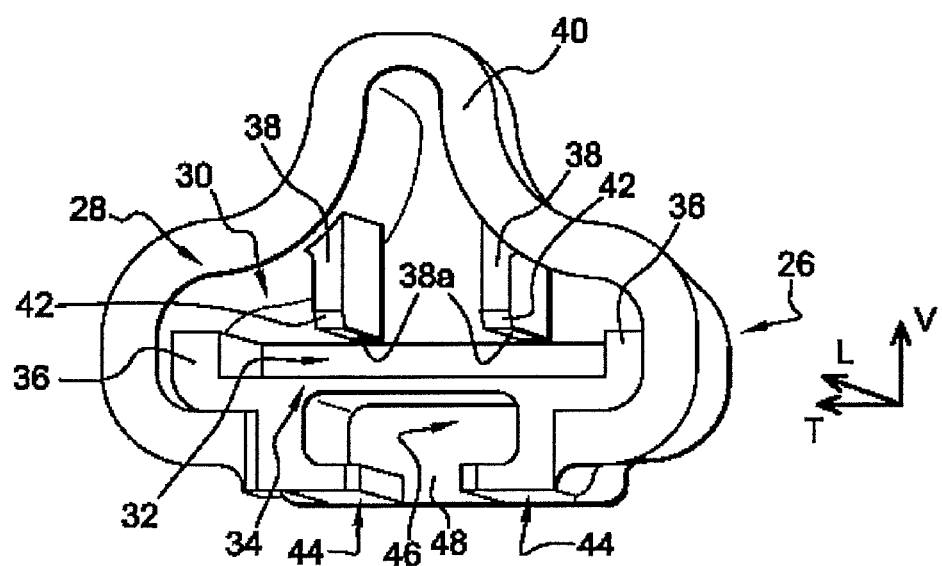
FIG. 5 is a schematic representation in perspective at another viewing angle of the fitting according to the invention shown in FIGS. 3 and 4.

As can be seen in more detail in FIGS. 3 to 5, each fitting 26 comprises a hollow main body 28 that is open at a first end of the fitting, is the rear end of the fitting 26, and is closed at the second end of the fitting 26, which is the front end of the fitting 26.

The hollow body 28 delimits an internal volume in which the front end 14a of the mount 14 and the front end 16a of the vertebra 16 are received.

The rear end of the hollow body 28 delimits a rear housing 30 in which the front end 14a of the mount 14 is received and a longitudinal housing 32 that extends the rear housing forwards, in which the front end 18a of the vertebra 16 is received.

The shape of the longitudinal housing 30 and the shape of the longitudinal housing 32 are roughly complementary to the shape of the front end 14a of the mount and the shape of the front end 16a of the vertebra 16, respectively.

As stated above, the vertebra 16 is a roughly horizontal element and consequently the longitudinal housing 32 is also roughly horizontal.

To delimit the longitudinal housing 32, the hollow body 28 comprises a horizontal lower bottom 34 and two vertical longitudinal walls 36 that extend upwards from the lower bottom 34.

The hollow body 28 also comprises two vertical longitudinal ribs 38 that extend downwards from a top wall 40 of the hollow body 28, and where the bottom edges 38a of the ribs 38 delimit the top part of the longitudinal housing 32.

The rear end 42 of each bottom edge 38a is also bevelled, in order to facilitate the introduction of the vertebra into the longitudinal housing 32.

Each rib 38 forms a longitudinal stop for the fitting 26 against the front end 14a of the mount 14.

The fitting 26 also comprises longitudinal hooks 44 that extend downwards from the bottom 34 of the longitudinal housing 32 and are curved transversely inwards so as to delimit a bottom housing 46 in which the top web of the rubber 18 is able to be received.

Finally, the fitting 26 comprises a front transverse vertical wall 48 that closes off the front end of the longitudinal housing 32 and of the bottom housing 46 so as to form a longitudinal stop for the vertebra 16 and rubber 18.

Thus, when the two fittings are mounted at the two ends 10a of the blade 10, they are secured to the vertebra 16, and each fitting forms a stop for the mount 14 and rubber 18 in longitudinal sliding forwards or backwards, consequently preventing the disconnection of the vertebra 16 and/or rubber 18 from the mount 14.

To achieve the locking of the vertebra 16 and rubber 18 with respect to the mount 14, the fitting 26 has means for locking the front end 16a of the vertebra 16 in the engaged position in the longitudinal housing 32.

The end 16a of the vertebra 16 has a notch 50 that is intended to cooperate with the locking means of the fitting 26.

As can be seen in FIG. 2, this notch 50 is produced in a lateral edge 52 of the vertebra 16 and extends transversely towards the inside of the vertebra, According to a preferred embodiment, each end 16a of the vertebra 16 has a notch 50, and these two notches 50 are produced in the same lateral edge 52 of the vertebra 16, as can be seen in FIG. 2.

The locking means comprise an elastic tongue 54 that extends substantially longitudinally forwards and is curved towards the inside of the longitudinal housing 32 so that the free front end 54a is able to be received in the associated notch 50 in the vertebra 16.

The tongue 54 is able to deform elastically towards the outside of the longitudinal housing 32 when the end 16a of the vertebra 16 is introduced into the longitudinal housing 32, and for this purpose the free end 54a of the tongue 54 bears against the lateral edge 52 of the vertebra.

Next, when the vertebra 16 is in position mounted in the longitudinal housing 32, the notch 50 is situated level with the free end 54a of the tongue 54. The tongue 54 then returns elastically to its initial configuration, so that its free end 54a is opposite a front transverse face 50a of the notch 50.

When the vertebra 16 has a tendency to leave the longitudinal housing 32, the front face 50a of the notch 50 comes into rearward abutment against the free front end 54a of the tongue 54.

The fitting 26 is produced so as to be able to be mounted equally well on one or other of the longitudinal ends 10a of the blade 10.

For this purpose, according to the invention, the locking means are produced symmetrically with respect to a vertical longitudinal mid-plane of the longitudinal housing 32.

Consequently the fitting 26 has two tongues 54 distributed on each side of said mid-plane, and one of the two tongues 54 is able to be engaged in the associated notch 50 in the end 16a of the vertebra 16 depending on whether the fitting is mounted on the front end 10a or rear end of the blade 10.

According to a preferred embodiment of the invention, the whole of the fitting 26 is symmetrical with respect to the vertical longitudinal mid-plane of the longitudinal housing 32.

The form of the hollow body 28 is thus defined so as to be able to cover each longitudinal end 14a of the mount 14, without limiting the aerodynamic effect of the blade 10.

This is because, as can be seen in FIG. 1, the mount 14 comprises a top flap 56 that is conformed aerodynamically so that the relative wind that is produced by the movement of the vehicle produces a force tending to press the blade 10 on the glazed panel.

As stated above, the rear housing 30 of the hollow body 28 is able to receive the longitudinal end 14a of the mount 14.

Thus, as can be seen in FIG. 5, the top part of the rear housing 30 corresponds to an addition of the profile of the top flap 56 with its symmetrical with respect to the symmetry plane.

According to a variant embodiment (not shown) of the blade 10, the profile of the flap 56 and more particularly the profile of the mount 14 is symmetrical with respect to the vertical longitudinal mid-plane.

This makes it possible to have better adjustment of the fittings on the ends 10a of the blade 10.

As stated above, the locking means comprise two tongues 54 distributed symmetrically on each side of the vertical longitudinal symmetry plane.

According to a preferred embodiment, the tongues 54 are produced in the lateral walls 36 of the longitudinal housing 32 so that their free ends 54a are able to move transversely when the vertebra 16 is introduced into the longitudinal housing 32.

In addition, as can be seen in FIG. 2, each end 16a of the vertebra 16 comprises a single notch 50. Thus, when the end 16a of the vertebra 16 is received in the longitudinal housing 32, the free end 54a of one of the two tongues 54 is received in the notch 50, the free end 54a of the other tongue 54 bears transversely against the associated edge of the vertebra 16.

To assist the transverse deformation of the tongues 54 towards the outside when it is inserted, the end 16a of the vertebra 16 comprises two bevels 58 forming ramps, on which the ends 54a of the tongues 54 bear.

According to a variant embodiment of the locking means (not shown), the tongues 54 are arranged in the top part of the longitudinal housing 32, for example at the bottom end edge 38a of each rib 38.

Thus the free ends 54a of the tongues 54 are able to move vertically when the tongues 54 are deformed between an idle low position, when the vertebra 16 is absent, or when the end 54a of the tongue 54 is received in a notch 50 in the vertebra 16, and deformed high position, for which the free end 54a of tongue 54 bears on the top face of the vertebra 16.

According to another aspect of the fitting 26 according to the invention, the means of locking the end 16a of the vertebra 16 in the longitudinal housing 32 are disengagable to enable the fitting 26 to be removed from the end 10a of the blade 10.

This makes it possible in particular to remove the rubber 18 out of the mount 14, when it is worn, in order to replace it with a new rubber 18.

For this purpose, the fitting 26 is designed so as to enable a tool to pass, such as a screwdriver, with a view to causing deformation of the tongue 54 that cooperates with a notch, to get the free end 54a of the tongue 54 out of the notch 50. The free end 16a of the vertebra is then no longer locked by the tongue 54, and can then emerge from the longitudinal housing 32.

As can be seen in FIGS. 2 and 3, the longitudinal housing 32 is open towards the bottom, at each tongue 54. The bottom 34 of the longitudinal housing 32 thus comprises two openings 60 distributed symmetrically with respect to the vertical longitudinal mid-plane, and each opening 60 is arranged in line with a tongue 54.

In addition, so that the bottom hooks 44 do not interfere with access to the tongues 54, the openings 60 are arranged transversely on each side of the hooks 44, as can be seen in FIGS. 2 and 3.

Thus, according to the invention and as can be seen in FIGS. 1 and 2, the blade 10 comprises two identical end fittings 26 that are mounted on each of its ends 10a.

The mounting of the fittings 26 according to the invention does not require any particular arrangement of the other components of the blade 10, in particular of the vertebra 16, with which the fittings cooperate for locking thereof.

Thus the vertebra 16 comprises a notch 50 at each of the ends 16a thereof, and the two notches are produced in the same lateral edge 52 of the vertebra 16.

The invention claimed is:

1. An end fitting for a wiper blade of longitudinal orientation, the blade comprising:

a stiffening vertebra, a wiping rubber, and a mount supporting the vertebra and rubber, wherein each of the vertebra, wiping rubber and mount are of longitudinal orientation, wherein:
the end fitting is able to be mounted on a longitudinal end of the blade, the end fitting comprises:
a longitudinal housing open in a direction of a first longitudinal end of the end fitting, into which a longitudinal end of the vertebra is able to be received, wherein the longitudinal housing is delimited by a horizontal lower bottom and two vertical longitudinal walls extending upwards from the horizontal lower bottom, and
elastic tongues for locking the longitudinal end of the vertebra in an engaged position in the longitudinal housing,
wherein each tongue extends longitudinally forward and is curved towards an inside of the longitudinal housing so that a free front end of each tongue is able to cooperate with an associated notch produced in a longitudinal edge of the longitudinal end of the vertebra,
wherein each tongue is configured to elastically deform in a plane substantially parallel to the horizontal lower bottom,
wherein the tongues are produced symmetrically with respect to a vertical longitudinal mid-plane of the longitudinal housing, and
wherein the horizontal lower bottom comprises two openings distributed symmetrically with respect to the vertical longitudinal mid-plane, each opening being arranged in line with one of the tongues.

2. The end fitting according to claim 1, wherein the end fitting is produced symmetrically with respect to the vertical longitudinal mid-plane of the longitudinal housing.

3. The end fitting according to claim 1, wherein the elastic tongues comprise two elastic tongues, each of which is produced in a wall of the longitudinal housing, extending longitudinally in the direction of a second longitudinal end of the end fitting, and wherein a free longitudinal end of each tongue is curved towards the inside of the longitudinal housing.

4. The end fitting according to claim 3, wherein a free end of one of the two tongues is able to be received in the notch in the longitudinal end of the vertebra, for locking the vertebra in position in the longitudinal housing.

5. The end fitting according to claim 3, wherein the two tongues are disengagable to enable the end fitting to be removed from the longitudinal end of the blade.

6. The end fitting according to claim 5, wherein the longitudinal housing is open towards the bottom at each elastic tongue to enable a tool to pass that is able to cause deformation of the tongues.

7. The end fitting according to claim 1, further comprising:
two bottom hooks distributed symmetrically with respect to the said vertical longitudinal mid-plane, which extend downwards from a bottom of the longitudinal housing and delimit a longitudinal conduit able to receive a top web of the wiping rubber.

8. The end fitting according to claim 7, wherein a second longitudinal end of the end fitting comprises a transverse vertical wall that closes off the associated end of the longitudinal conduit.

9. The end fitting according to claim 1, further comprising a hollow body in which the longitudinal housing is produced and which comprises a housing that extends the longitudinal housing towards the first longitudinal end of the end fitting and in which a longitudinal end of the mount is able to be received.

10. An end fitting for a wiper blade of longitudinal orientation, the blade comprising:
a stiffening vertebra, a wiping rubber, and a mount supporting the vertebra and rubber, wherein each of the vertebra, wiping rubber and mount are of longitudinal orientation, wherein:
the end fitting is able to be mounted on a longitudinal end of the blade, the end fitting comprises:
a longitudinal housing open in a direction of a first longitudinal end of the end fitting, into which a longitudinal end of the vertebra is able to be received, wherein the longitudinal housing is delimited by a horizontal lower bottom and two vertical longitudinal walls extending upwards from the horizontal lower bottom,
longitudinal hooks extending downwards from the horizontal lower bottom of the longitudinal housing so as to delimit a bottom housing in which a top web of the rubber is able to be received, and
tongues for locking the longitudinal end of the vertebra in an engaged position in the longitudinal housing,
wherein each tongue is able to cooperate with a notch produced in a longitudinal edge of the longitudinal end of the vertebra,
wherein the tongues are produced symmetrically with respect to a vertical longitudinal mid-plane of the longitudinal housing, and
wherein the horizontal lower bottom comprises two openings distributed symmetrically with respect to the vertical longitudinal mid-plane, each opening being arranged in line with one of the tongues.

11. The end fitting according to claim 10, wherein the longitudinal hooks are curved transversely inwards.

12. The end fitting according to claim 10, wherein the openings are arranged transversely on each side of the hooks.

13. An end fitting for a wiper blade of longitudinal orientation, the blade comprising:
a stiffening vertebra, a wiping rubber, and a mount supporting the vertebra and rubber, wherein each of the vertebra, wiping rubber and mount are of longitudinal orientation, wherein:
the end fitting is able to be mounted on a longitudinal end of the blade, the end fitting comprises:
a longitudinal housing open in a direction of a first longitudinal end of the end fitting, into which a longitudinal end of the vertebra is able to be received, wherein the longitudinal housing is delimited by a horizontal lower bottom and two vertical longitudinal walls extending upwards from the horizontal lower bottom, and
elastic tongues for locking the longitudinal end of the vertebra in an engaged position in the longitudinal housing,
wherein each tongue extends longitudinally forward and is curved towards an inside of the longitudinal housing so that a free front end of each tongue is able to cooperate with an associated notch produced in a longitudinal edge of the longitudinal end of the vertebra,
wherein each tongue is configured to elastically deform in a direction of one vertical longitudinal wall delimiting the longitudinal housing,
wherein the tongues are produced symmetrically with respect to a vertical longitudinal mid-plane of the longitudinal housing, and
wherein the horizontal lower bottom comprises two openings distributed symmetrically with respect to the vertical longitudinal mid-plane, each opening being arranged in line with one of the tongues.

* * * * *